United States Patent
Sailer et al.

(10) Patent No.: US 8,484,798 B2
(45) Date of Patent: Jul. 16, 2013

(54) SYSTEM COMPRISING A VACUUM CLEANER AND A DUST BAG

(75) Inventors: Eduard Sailer, Harsewinkel (DE); Martin Kornberger, Bielefeld (DE); Guenther Ennen, Enger (DE); Stefan Tiekoetter, Bielefeld (DE)

(73) Assignee: Miele & Cie. KG, Guetetsloh (DE)

( * ) Notice: Subject to any disclaimer, the term of this patent is extended or adjusted under 35 U.S.C. 154(b) by 54 days.

(21) Appl. No.: 13/314,228

(22) Filed: Dec. 8, 2011

(65) Prior Publication Data
US 2012/0144618 A1    Jun. 14, 2012

(30) Foreign Application Priority Data
Dec. 9, 2010 (EP) .................................... 10401215

(51) Int. Cl.
*A47L 9/14* (2006.01)
(52) U.S. Cl.
USPC ......... 15/347; 15/DIG. 8; 55/361; 55/DIG. 2; 55/DIG. 3

(58) Field of Classification Search
USPC ................... 15/347, DIG. 8; 55/361, DIG. 2, 55/DIG. 3
IPC ......................................................... A47L 9/14
See application file for complete search history.

(56) References Cited

U.S. PATENT DOCUMENTS
4,145,196 A    3/1979    Alskog

FOREIGN PATENT DOCUMENTS

| CA | 2335053 A1 | 1/2000 |
|---|---|---|
| DE | 20209923 U1 | 7/2003 |
| DE | 102008061250 A1 | 4/2009 |
| DE | 102008045683 A1 | 3/2010 |
| WO | WO 0000269 A1 | 1/2000 |

*Primary Examiner* — David Redding
(74) *Attorney, Agent, or Firm* — Leydig, Voit & Mayer, Ltd.

(57) ABSTRACT

A system includes a vacuum cleaner with a dust chamber having ribs and a dust bag including a fleece disposed on a supporting structure. The fleece includes a plurality of fleece corrugations, with a distance between the fleece corrugations being matched to a distance between the dust chamber ribs. The resultant matching of the fleece corrugation spacing and the spacing of the dust chamber rib prevents partial or large-area contact of portions of the dust bag with an inner surface of the dust chamber.

11 Claims, 7 Drawing Sheets

SYSTEM COMPRISING A VACUUM CLEANER AND A DUST BAG

CROSS REFERENCE TO RELATED APPLICATIONS

This application claims priority to European Patent Application No. 10 401 215.8, filed Dec. 9, 2010, which is hereby incorporated by reference herein in its entirety.

FIELD

The present invention relates to a system comprising a vacuum cleaner and a dust bag intended for use as a dust collector in the vacuum cleaner.

BACKGROUND

Conventional vacuum cleaners usually contain a dust collector in the form of a dust bag which is more or less unstable in shape and is continuously filled with dust during operation of the vacuum cleaner. In the vacuum cleaner, the dust bag is enclosed by a volume referred to as a dust chamber. The dust chamber on the one hand provides an abutment for the dust bag, and thus functions to stabilize the dust bag during operation of the vacuum cleaner. On the other hand, the dust chamber also serves to guide and direct the substantially dust-free air flow emerging from the dust bag. However, when the dust bag is acted upon by an air flow, the sides of the dust bag lay partially against the walls of the dust chamber, thereby impeding optimum flow through the bag. As a result, the fleece layers of the dust bag, or the dust bag itself, can sometimes not be optimally loaded with dust, which reduces the service life of the dust bag. The dust chamber, as it were, determines the shape of the dust bag when the bag is acted upon by the air stream generated by the fan. In addition, a dust deposit formed during vacuuming is not thrown off the inner surfaces of the dust bag when turning off the vacuum cleaner fan. This also has a negative effect on the service life and the uniformity or evenness of the suction power.

German Patent Application DE 10 2008 045 683 A1 describes a dust filter bag surrounded by a net lying against the outer surface of the bag wall. The extensibility of the net is less than that of the bag wall.

U.S. Pat. No. 4,145,196 is directed to optimizing a filter element for a vacuum cleaner and aims at preventing damage to the filter element or a filter fleece thereof. The filter element includes a sack on the inner side of which is disposed the filter fleece. A spacer having a corrugated surface is provided between an outer housing and the filter element. During operation, the filter element lies against the crests of the corrugated surface. Thus, the corrugated surface and the crests thereof are functionally substantially equivalent to rib-shaped structures, such as the dust chamber ribs extending into a dust chamber of current vacuum cleaners. Both are intended to prevent large-area contact between the dust bag, or the respective sack and filter fleece described U.S. Pat. No. 4,145,196, and structural features of the vacuum cleaner housing, and thus to permit continued flow therethrough. In U.S. Pat. No. 4,145,196, in order to stabilize the filter element, a grid-like stabilizing structure is provided for the sack, and the mesh width of the grid is smaller than the distance between two adjacent crests of the corrugated surface of the spacer. The grid is intended to prevent an otherwise possible movement of portions of the filter fleece into valleys between two respective adjacent crests of the corrugated surface. Such reduction in mobility, in turn, is intended to prevent damage to the filter element.

FIG. 1 shows, in a simplified schematic view, a vacuum cleaner 1 having a dust bag 10 mounted in a dust chamber 2. A fan 4 generates an air stream 5 that passes through vacuum cleaner 1 and thus also through dust bag 10. Air stream 5 is supplied to dust bag 10 through a hose 6 and a bag opening 11.

FIG. 2 illustrates, in a simplified schematic view, the basic design of a conventional dust bag 10. In addition to the actual fleece 13 for collecting in particular small dust particles, dust bag 10 also has, on its upper surface, a static net-like supporting structure 12 which mechanically stabilizes bag 10 and, moreover, protects the dust bag 10 from damage when vacuuming sharp items.

FIG. 3 shows a special, structured embodiment of a fleece 13 of a dust bag 10. Fleece 13 has a wavy or hump-shaped configuration in order to provide a larger filter area and thus a higher dust holding capacity.

FIG. 4 shows a top cross-section through vacuum cleaner 1 and its dust chamber 2, illustrating the spatial arrangement of dust bag 10 in dust chamber 2. Dust bag 10 is supported at various points by dust chamber ribs 3, which prevent dust bag 10 from laying against the walls of dust chamber 2 in some sections or entirely, which would considerably impair the flow through dust bag 2. Nevertheless, when vacuum cleaner 1 is in operation and air stream 5 acts on the dust bag, the bag extends into the regions between ribs 3 of dust chamber 2 and partially contacts the walls of dust chamber 2.

Thus, such a construction does not provide any solution that would prevent dust bag 10 from laying against the walls of dust chamber 2.

SUMMARY

In an embodiment, the present invention provides a system including a vacuum cleaner with a dust chamber having ribs and a dust bag including a fleece disposed on a supporting structure. The fleece includes a plurality of fleece corrugations, with a distance between the fleece corrugations being matched to a distance between the dust chamber ribs so as to provide matching of the fleece corrugation spacing and the spacing of the dust chamber rib so as to prevent partial or large-area contact of portions of the dust bag with an inner surface of the dust chamber.

BRIEF DESCRIPTION OF THE DRAWINGS

Exemplary embodiment of the present invention are described in more detail below with reference to the drawings, wherein corresponding objects or elements are identified by the same reference numerals in all figures.

It is understood that neither the embodiment depicted in the drawings nor any other exemplary embodiment should be construed as limiting the scope of the present invention. Rather, within the scope of the present disclosure, numerous changes and modifications are possible, in particular ones which, for example, by combining or altering individual features or method steps described in the general description and in the context of the, or each, exemplary embodiment, as well as the claims, and contained in the drawings, may be inferred by one skilled in the art with regard to achieving the objective, and lead, through combinable features, to a new subject matter or to new method steps or sequences of method steps.

In the drawings:

FIG. 1 shows a prior art vacuum cleaner;

FIG. 2 shows a prior art dust bag;

FIG. 3 shows a structured embodiment of a prior art fleece of a dust bag;

FIG. 4 is a cross-sectional view through a prior art vacuum cleaner and its dust chamber, showing the spatial arrangement of the dust bag;

FIGS. 5a and 5b are cross-sectional views through a portion of a dust bag (wall portion of the dust bag);

FIG. 6 shows an embodiment of the dust bag wall that features strip-shaped supporting elements;

Figure 7:
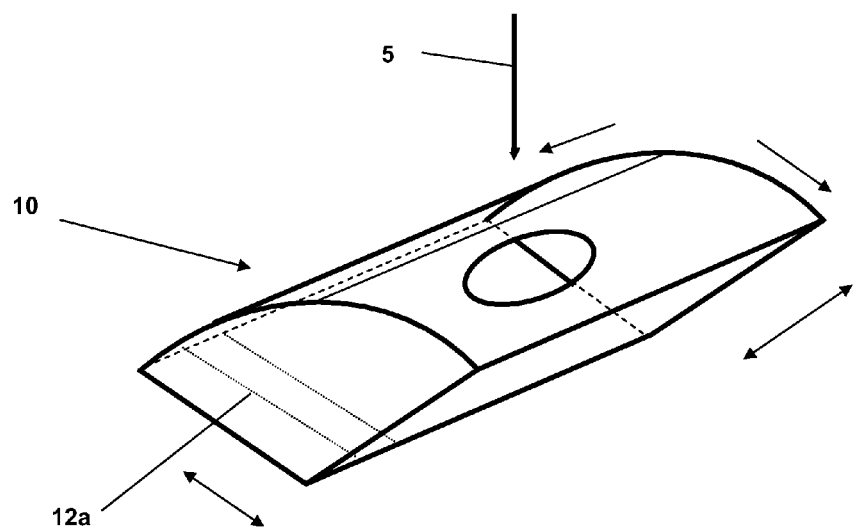
Figure 8:
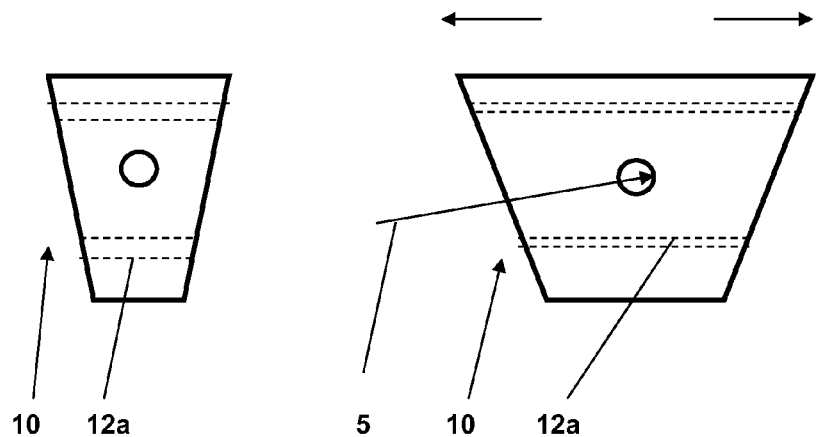
Figure 9:
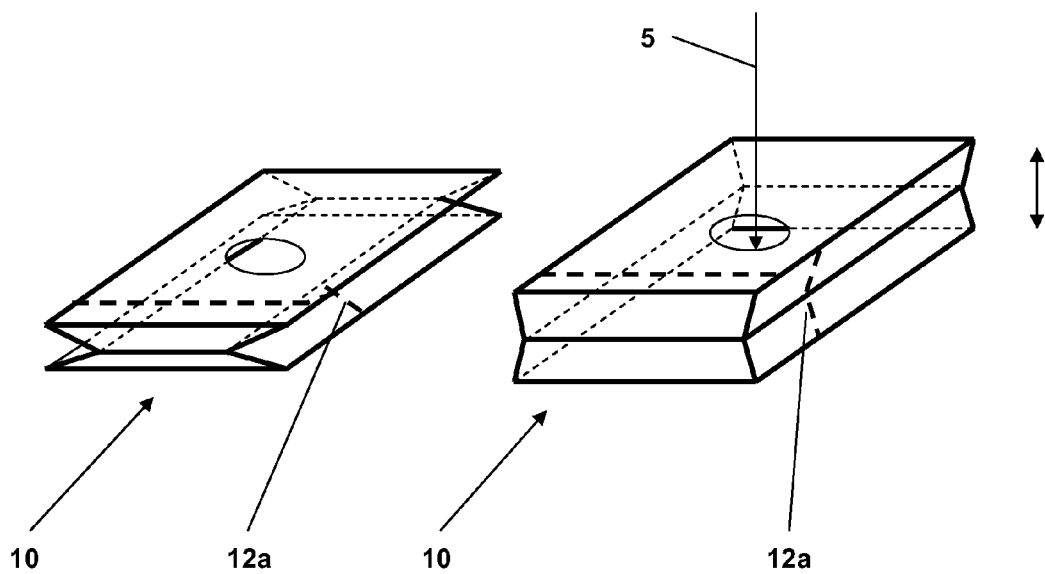
Figure 10:
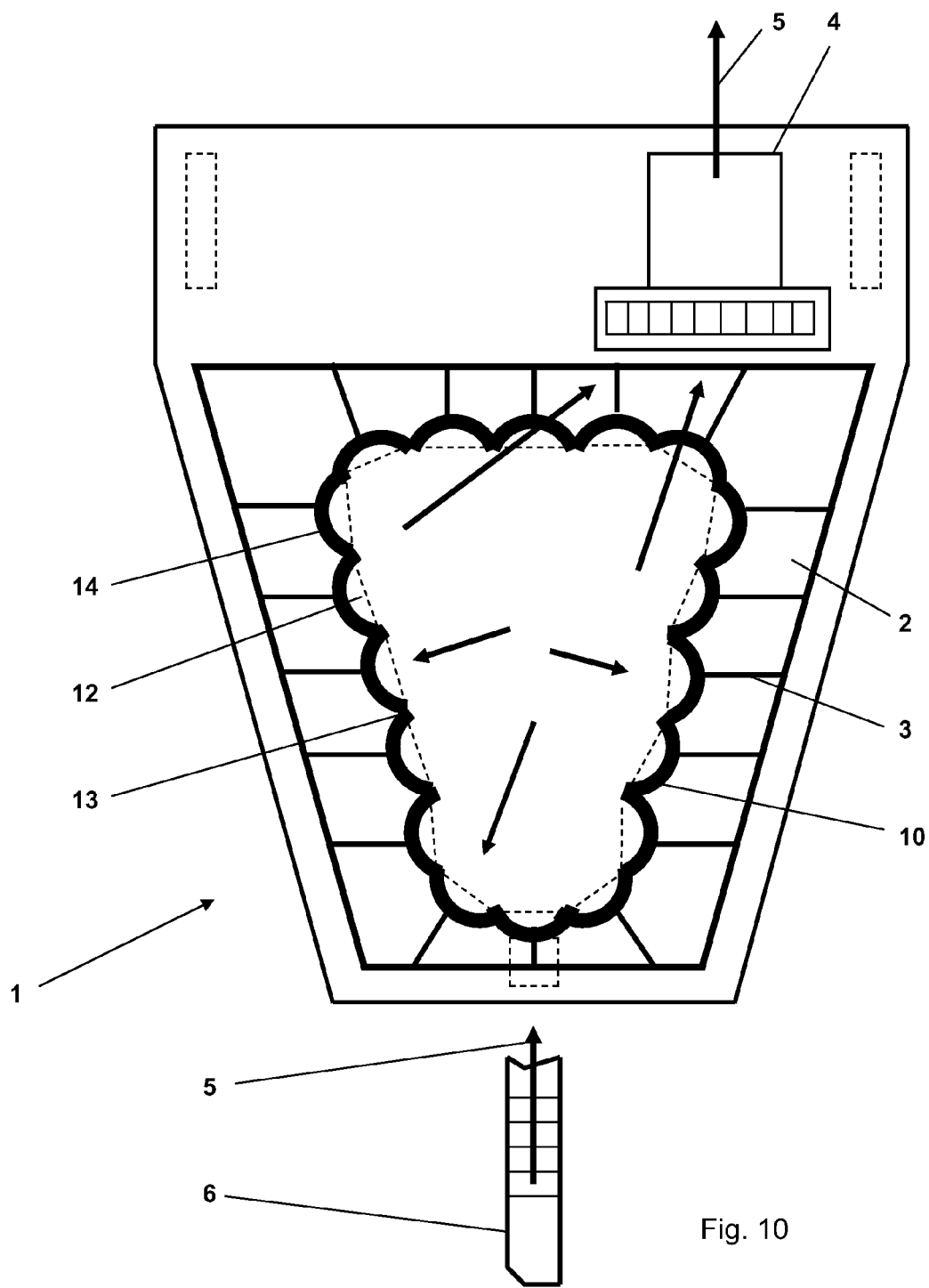

FIGS. 7, 8 and 9 show dynamic shapes of vacuum cleaner bags, such as can be obtained using suitably positioned and oriented supporting structures or elements, especially extensible ones; and FIG. 10 shows a dust bag having a surface that is structured by fleece corrugations, shown in a dust chamber of a vacuum cleaner and with extended supporting structures; i.e., in a state where it is acted upon by an air stream.

DETAILED DESCRIPTION

In an embodiment, the present invention provides an improved a dust bag in such a way that pressure losses, which occur when the dust bag comes into contact with the dust chamber wall in some sections or over a large area, will be avoided or reduced. Moreover, an embodiment of the present invention provides a system including a vacuum cleaner and a so-improved dust bag designed for it.

In a system including a vacuum cleaner and a dust bag designed for it, where the vacuum cleaner has a dust chamber configured with ribs, and the dust bag has a fleece on a supporting structure, embodiments of the present invention include a plurality of corrugations in the fleece and by a fleece corrugation spacing that is matched to that of the dust chamber ribs. On the one hand, the fleece is attached to the supporting structure in such a way that it forms a plurality of corrugations. To this end, the fleece corrugations are connected (e.g., glued, sewed, etc.) to the supporting structure only in regions of transition from one fleece corrugation to an adjacent fleece corrugation. On the other hand, a distance between the fleece corrugations is matched to a distance between the dust chamber ribs. This matching of the fleece corrugation spacing to that of the dust chamber ribs prevents contact of the dust bag with the dust chamber and its walls; i.e., partial or large-area contact between portions of the dust bag and the inner surface of the dust chamber.

The spacing is preferably matched to that of free ends of the dust chamber ribs; a free end being understood to be one that extends into the dust chamber. Specifically, if to this end, a width of the fleece corrugations, or an integral multiple thereof, is at least equal to the distance between the dust chamber ribs, then this allows the dust bag to occupy such a position within the dust chamber that the crest of each fleece corrugation is located in front of a dust chamber rib, or that a fleece corrugation or a plurality of fleece corrugations is located in the space between each two adjacent dust chamber ribs. Thus, the dust bag is positioned in a very uniform manner. In addition, if the effective height of the dust chamber ribs is greater than a height of the fleece corrugations, then the dust chamber ribs prevent contact between the fleece corrugations and the peripheral surfaces of the dust chamber. This permits continued flow through the fleece corrugations. Moreover, if tops or free ends of the dust chamber ribs engage in spaces between each two fleece corrugations, then this causes the dust bag to be positioned in a particularly favorable manner, because then the dust chamber ribs function to hold in place and align the fleece corrugations, and thus, the dust bag in its entirety. In particular, the positional fixation of each interspace by a free end of a respective one of the dust chamber ribs prevents displacement of portions of the dust bag within the dust chamber. In continuation of these aspects, it is also conceivable to arrange the dust chamber ribs in the dust chamber in such a way that some ribs engage in spaces between two respective fleece corrugations to align the dust bag, while other dust chamber ribs each support a fleece corrugation in the region of its crest.

Very generally, the advantages of the present invention and its embodiment can be summarized as follows: The dust bag, or another filtration device designed like a dust bag or for a purpose similar to that of a dust bag, is stabilizes itself by means of the supporting structure. The fleece corrugations create a high dust holding capacity and permit a flow-optimized spatial arrangement in the mounting location (e.g., a dust chamber of a vacuum cleaner). This flow-optimized spatial arrangement further results in the dust bag being homogeneously loaded with dust during operation. As a result of the wavy surface created by the corrugations of the fleece, there is only point or line contact between the dust bag and a surrounding volume in the mounting location (e.g., a dust chamber). This avoids flow losses, which would otherwise occur in the case of areal contact with a surrounding volume.

Embodiments of the present invention are the subject matter of the dependent claims. The back-references used therein refer to the further development of the subject matter of the main claim by the features of the respective dependent claim. In addition, they may also include independent inventions, whose creation is independent of the subject matters of the preceding claims, and are not to be understood as renouncing attainment of an independent protection of subject matter for the features thereof Furthermore, with regard to an interpretation of the claims in the case of a more detailed concretization of a feature in a subordinate claim, it is to be assumed that a restriction of said kind is not present in the respective preceding claims.

In one embodiment of the system, the supporting structure of the dust bag functions to define a dust bag geometry that is adapted to the dust chamber. Thus, the shape of the dust bag is no longer defined by the dust chamber of the vacuum cleaner. Instead, the geometry of the dust bag is defined by the bag itself. A dust bag having a geometry defined in this way no longer needs to be stabilized by the dust chamber.

In another embodiment, the supporting structure of the dust bag is extensible transversely to a longitudinal direction of the fleece corrugations. The advantage of this aspect of the invention is that the extensibility of the supporting structure causes or allows the fleece corrugations to unfold. When the fleece corrugations are unfolded upon extension of the supporting structure, the effective surface area of the dust bag is increased on the one hand, while on the other, the shape of the dust bag and its volume in the unfolded state; i.e., when flow is going through it, are defined by the dust bag itself. Specifically, extension of the supporting structure causes each one of the fleece corrugations to unfold in front of a respective dust chamber rib, or one or a plurality of fleece corrugations to unfold into the space between each two adjacent dust chamber ribs. Thus, the dust bag is unfolded in a very uniform manner. In addition, in the case of an extensible supporting structure, too, if the effective height of the dust chamber ribs is greater than a height of the fleece corrugations, then the dust chamber ribs prevent contact between the fleece corrugations and the peripheral surfaces of the dust chamber. Here too, continued flow through the fleece corrugations remains possible. Moreover, if, when the supporting structure is in the extended state, tops or free ends of the dust chamber ribs engage in spaces between each two fleece corrugations, then this causes the dust bag to be positioned in a particularly favorable manner, because in the case of an extensible supporting structure, too, the dust chamber ribs then function to hold in place and align the fleece corrugations, and thus, the dust bag in its entirety. In particular, the positional fixation of each interspace by a free end of a respective one of the dust chamber ribs prevents displacement of portions of the dust bag within the dust chamber. In continuation of these aspects, it is also conceivable to arrange the dust chamber ribs in the dust chamber in such a way that some ribs engage in spaces between two respective fleece corrugations to align the dust bag, and that in front of other dust chamber ribs, in particular the majority of the dust chamber ribs, a respective one of the fleece corrugations will unfold. In a functional reversal of this aspect, a conventional or uniform spacing of the dust chamber ribs in the dust chamber can be maintained, and the engagement of individual ribs in a space between two respective adjacent fleece corrugations on the one hand, and the unfolding of other fleece corrugations in front of a dust chamber rib on the other hand can be achieved by means of suitably varied sizes or heights of the fleece corrugations along the peripheral surface of dust bag.

If an air stream generated by a fan of the vacuum cleaner causes the supporting structure to extend, a dust bag volume obtainable through extension of the supporting structure and/or a geometry obtainable through extension of the supporting structure is/are obtained immediately after turning on the vacuum cleaner and activating its fan. In addition, the supporting structure and the fleece corrugations may be configured in such a way that the extension of the supporting structure decreases as soon as the fan is turned off. As a result, dust that has accumulated in the fleece corrugations falls off the fleece. Thus, the turning on and off of the fan required during normal use of the vacuum cleaner results, as it were, in a regeneration of the fleece.

If the air stream generated by the fan causes the supporting structure of the dust bag to extend in such a way that the fleece corrugation spacing matched to that of the dust chamber ribs is obtained, then the geometry intended for the dust bag is reached immediately after the vacuum cleaner is turned on and without areal contact between the dust bag and the dust chamber. Specifically, the fleece corrugation spacing matched to that of the dust chamber ribs is obtained when the supporting structure is extended to its maximum, and this maximum extension of the supporting structure, in turn, is produced by the air stream generated during normal operation of the vacuum cleaner.

If an effective surface area, herein referred to as free flow area of the dust bag, is doubled, or substantially doubled, under the action of the air stream, the so-increased effective surface area is then available for dust collection, which, on the one hand, improves the removal of dust from the air stream and, on the other hand, increases the service life of the dust bag; i.e., the period of time during which the filter may remain in use.

In an embodiment, the present invention provides a filtration device which can be used in particular for a dust bag 10 and which has only point contact, i.e., no areal contact, or a least no large-area contact, with dust chamber 2; i.e., which contacts, for example, only the tops of dust chamber ribs 3, as it were, one-dimensionally.

Figure 1:
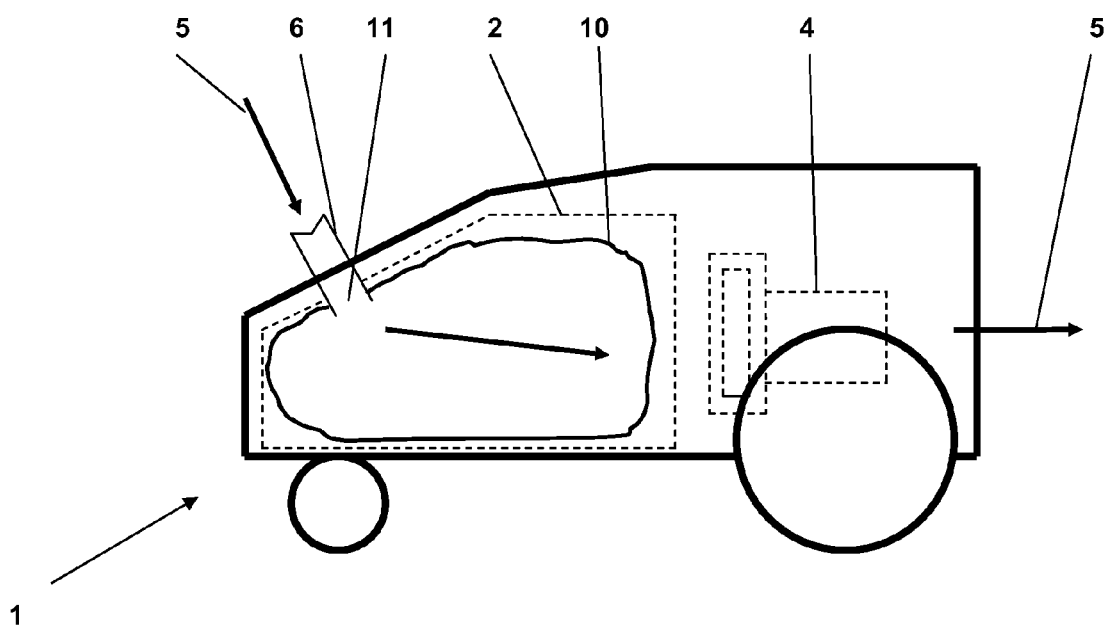
Figure 2:
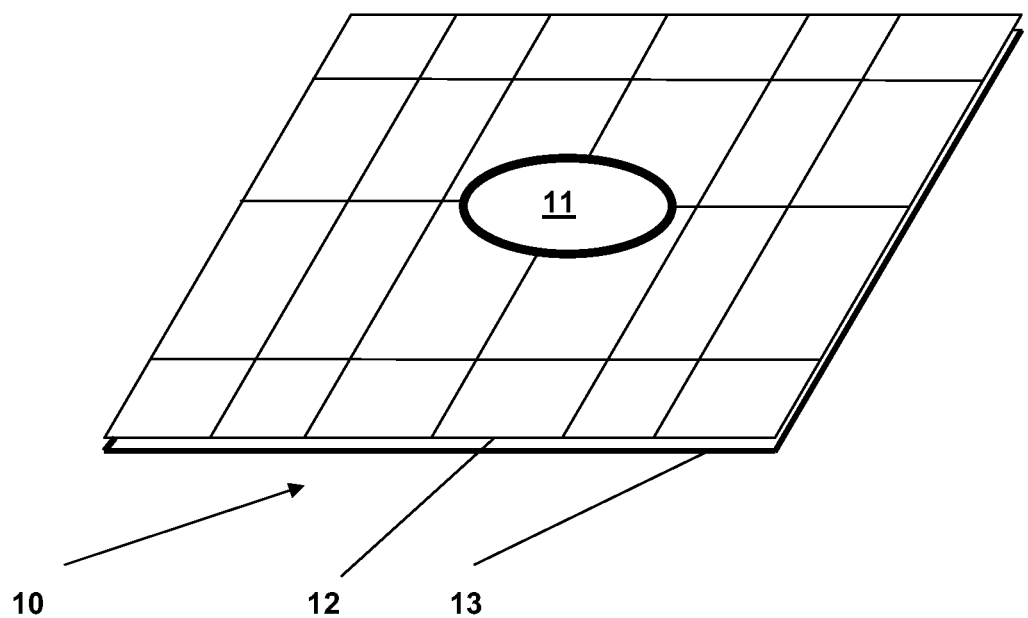
Figure 3:
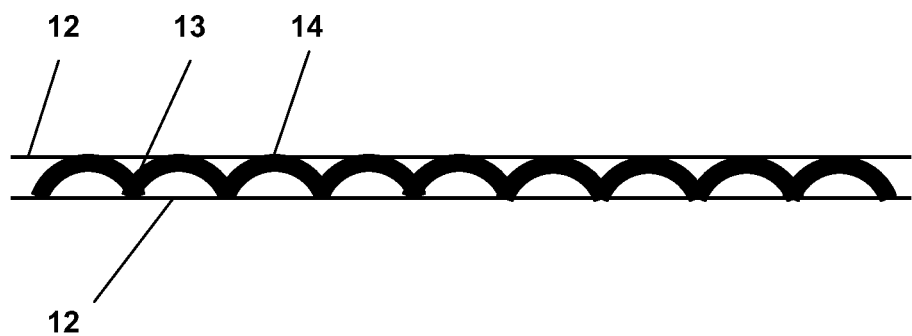
Figure 4:
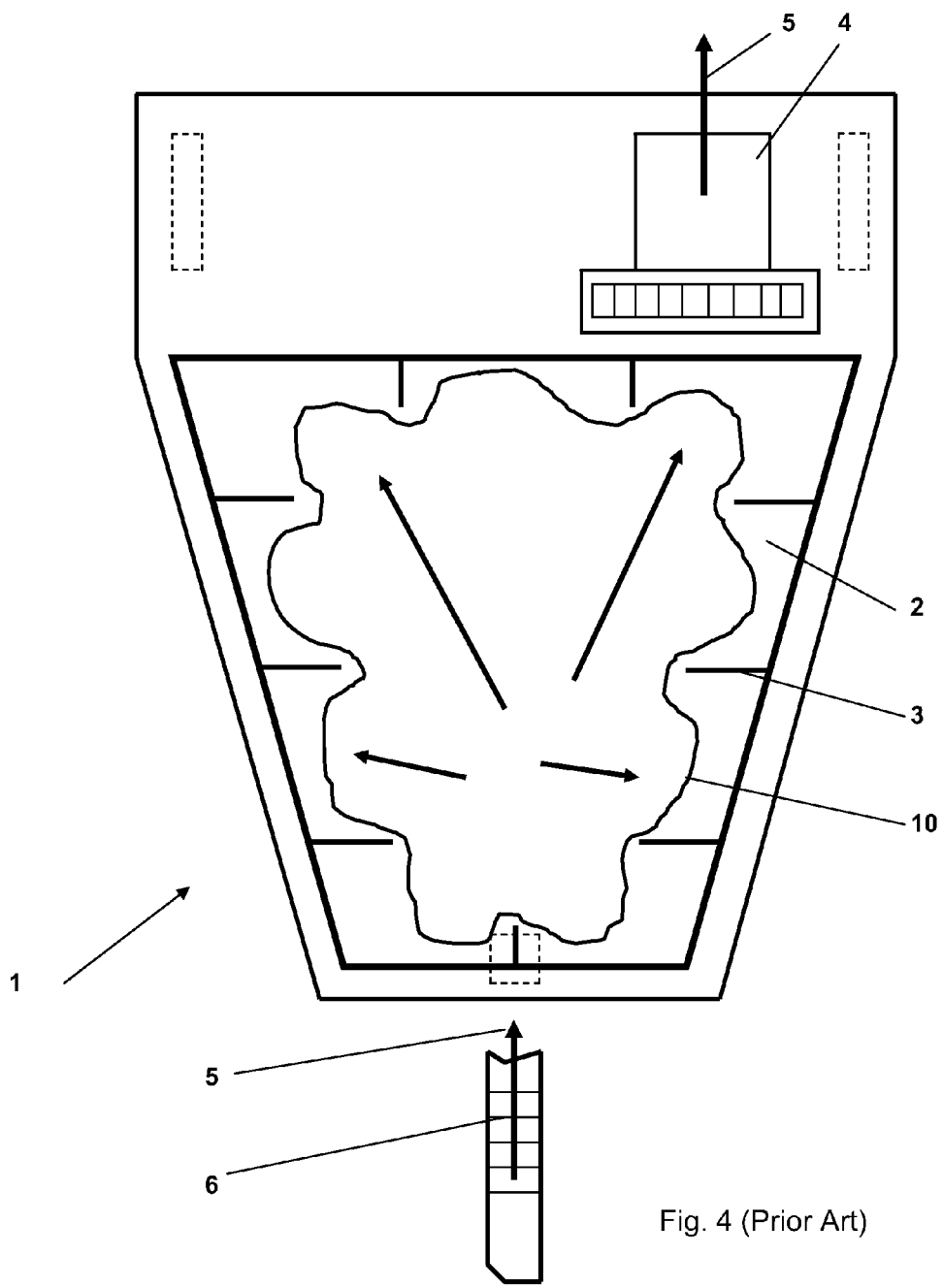
Figure 5A:
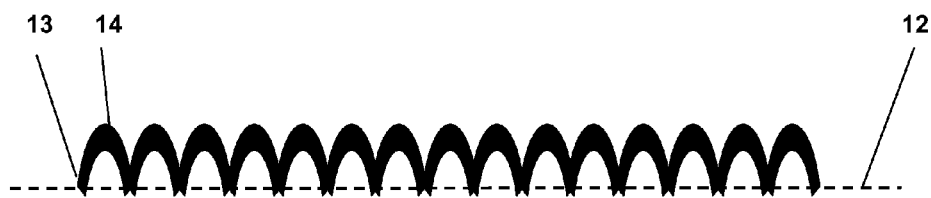
Figure 5B:
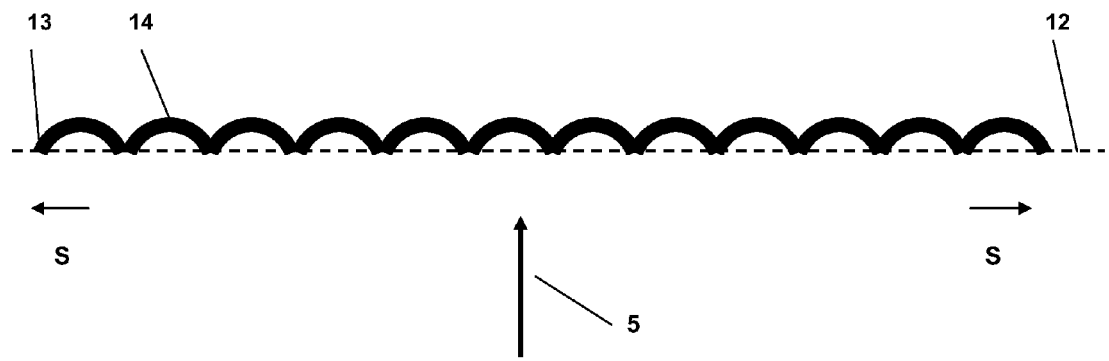

FIGS. 5a and 5b show a cross-sectional view through a portion of a filtration device or a bag surface; i.e., a wall portion of dust bag 10, to illustrate a configuration of the proposed filtration device and the proposed dust bag 10, respectively. Shown here is only the surface portion of the bag. Therefore, dust bag 10 is not discernible in its entirety.

Here and in the following, the terms "dust bag", "dust bag surface" and "dust bag wall" on the one hand, and "filtration device" on the other, are used synonymously, so that any reference to the dust bag or its components will be understood to also encompass the filtration device included or one that may be used in another context.

According to FIGS. 5a and 5b, dust bag 10 includes a fleece 13 which, due to a wavy structure, pleating, or the like, has or forms a plurality of corrugations 14. The individual fleece corrugations 14 are fixed by a supporting structure 12 on the inner side at regular or equal intervals. Specifically, fleece corrugations 14 are connected (e.g., sewed, glued, etc.) to supporting structure 12 only in regions of transition from one fleece corrugation 14 to a respective adjacent fleece corrugation 14. This connection may be produced at discrete points or along lines, or using mixed forms of point and line connections. Supporting structure 12 may be elastic or extensible and, together with fleece 13 and fleece corrugations 14, determines the shape of dust bag 10. In the case of an elastic supporting structure 12, the shape of dust bag 10 is produced when the bag is acted upon by air stream 5. In that case, the surface of dust bag 10 is dynamic.

Figure 6:
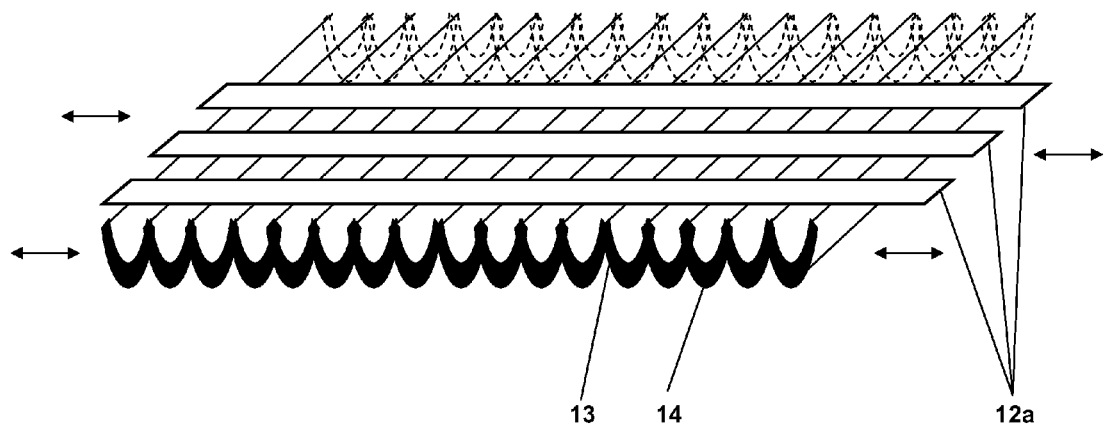

In the case of an extensible supporting structure 12, the supporting structure is in a relaxed state when not acted upon by air stream 5, and thus, the width of the open ends of fleece corrugations 14 is minimal; it being preferred for supporting structure 12 to be configured as a grid or in the form of supporting elements 12a, such as, for example, bands, oriented transversely to the longitudinal orientation of fleece corrugations 14 (FIG. 6). The elasticity of supporting structure 12 is selected such that a final extended state; i.e., a maximum extension of supporting structure 12 is obtained even when an air stream 5 acting thereon is minimal.

In the case of an elastic supporting structure 12, the supporting structure is extended a defined distance S (FIG. 5b) under the action of air stream 5 after fan 4 is turned on, thereby expanding (unfolding) fleece corrugations 14. This results in an increased flow path; i.e., an increased flow area of fleece corrugations 14 (FIG. 5b), which increases the effective surface area of fleece 13. When fan 4 is turned off, elastic supporting structure 12 returns fleece corrugations 14 to their original position (FIG. 5a). The extensibility of supporting structure 12 is preferably selected such that the free flow area is doubled, or substantially doubled, under the action of air stream 5. Alternatively, or in addition to the round or radial shape of fleece corrugations 14 shown, it is also conceivable for the corrugations to have a dovetail-like or sawtooth-like shape. It is also possible to combine the aforementioned shapes, so that, for example, a plurality of sawteeth is provided on a round (basic) shape. In this manner, the effective surface area of fleece corrugations 14 can be further increased. It is, of course, immediately apparent that the shape of fleece corrugations 14 is limited only by manufacturing constraints.

Supporting structure 12 stabilizes dust bag 10 when it is acted upon by air stream 5 generated by fan 4. Therefore, dust chamber ribs 3 are no longer needed to stabilize dust bag 10. The only, or at least nearly only, remaining function of dust chamber ribs 3 is to guide air stream 5 when it exits through the bag surfaces and moves toward fan 4.

FIG. 7 shows that in one embodiment, dust bag 10 includes portions which are provided with supporting elements 12a of different elasticity as a supporting structure 12. This makes it possible to control the shape of dust bag in the unfolded open condition. In this exemplary embodiment, the bases of a prismatic geometry of dust bag 10 have supporting elements 12a which are relatively rigid; i.e., have limited elasticity, while the supporting structure 12 of the curved top surface is elastic. When dust bag 10 is acted upon by air stream 5, then the basically prismatic shape shown in FIG. 7 is produced.

In another embodiment, supporting structure 12 includes strip-shaped supporting elements 12a of different lengths. Again, dust bag 10 is thereby given different shapes; i.e., the shape is predetermined by portions of different elasticity, as is illustrated in FIG. 8.

FIG. 9 shows a further embodiment of dust bag 10. In the case of a basically box-shaped unfoldable bag 10, supporting elements 12a function to dynamize the folding and to stabilize a top surface and a bottom surface. Thus, in all dust bag shapes shown, and in other conceivable ones, supporting structure 12 functions to define an unfolded volume and geometry of dust bag 10.

Furthermore, a, for example, round or radial shape of fleece corrugations 14 ensures that they make only point contact with dust chamber ribs 3, in particular, the tops thereof, when acted upon by air stream 5. This is illustrated in schematically simplified form in the view of FIG. 10, which applies equally to a dust bag 10 having an elastic supporting structure 12 and one having a non-elastic supporting structure 12. In any case, it is advantageous if the width of fleece corrugations 14, or an integral multiple thereof, is at least equal to the distance between dust chamber ribs 3 which serve as supporting ribs. Even if a fleece corrugation 14 slides into a space between dust chamber ribs 3 during the unfolding of dust bag 10, it will not come into areal contact with the wall of dust chamber 2 at this position. The wavy surface of dust bag 10 ensures that there may always be only point or line contact; i.e., a one-dimensional contact—if at all. This provides optimal flow of air stream 5 through dust bag 10 at all times, and fleece 13 is homogeneously loaded with dust. In this manner, the service life of dust bag 10 is optimally used. In an embodiment not shown, the tops of dust chamber ribs 3 engage in the spaces, or in individual spaces, between two respective adjacent fleece corrugations 14. In this embodiment, too, the same favorable conditions are obtained in terms of optimum flow passage, homogenous throughput of dust, and improved service life.

The dynamization of the dust bag surface achieved by elastic supporting structure 12 and the structured, in particular corrugated configuration of fleece 13 allows dust that has accumulated in the fleece corrugations 14 to fall off fleece 13 after vacuum cleaner 1 is turned off, which also increases the service life of bag 10. Fleece 13 is, as it were, regenerated by the turning on and off of vacuum cleaner 1.

The exemplary embodiments should not be construed as limiting the invention to dust bag 10. Rather, it is also within the scope of the present disclosure to use the same approach to devise modifications which may also be used in other filtration devices.

Thus, the individual aspects of particular embodiments of the present invention can be summarized as follows: A filtration device which may be used, for example, for a dust bag 10 stabilizes itself due to its configuration and thus determines the shape of dust chamber 2 and, in addition, enables flow-optimized loading with dust by the dynamization of the dust bag surface. A vacuum cleaner 1 having such a dust bag 10 can have the fleece 13 attached to supporting structure 12 in such a way that it forms a plurality of corrugations 14 and, on the other hand, allows a distance between fleece corrugations 14 when supporting structure 12 is in the extended state to be matched to a distance between dust chamber ribs 3.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

| | |
|---|---|
| 1 | vacuum cleaner |
| 2 | dust chamber |
| 3 | dust chamber rib |
| 4 | fan |
| 5 | air stream |
| 6 | hose |
| 10 | dust bag |
| 11 | bag opening |
| 12, 12a | supporting structure |
| 13 | fleece |
| 14 | fleece corrugation |

What is claimed is:

1. A system comprising:
a vacuum cleaner including a dust chamber having ribs, and
a dust bag including a fleece disposed on a supporting structure, the fleece including a plurality of fleece corrugations, a distance between the fleece corrugations being matched to a distance between the dust chamber ribs so as provide matching of the fleece corrugation spacing and the spacing of the dust chamber ribs so as to prevent partial or large-area contact of portions of the dust bag with an inner surface of the dust chamber.

2. The system recited in claim 1, wherein each dust chamber rib includes a free end extending into the dust chamber and the distance between the fleece corrugations is matched to the distance between the free ends of the dust chamber ribs.

3. The system recited in claim 1, wherein the supporting structure of the dust bag is configured so as to define a geometry of the dust bag that is adapted to the dust chamber.

4. The system recited in claim 1, wherein the supporting structure of the dust bag is extensible transversely to a longitudinal direction of the fleece corrugations.

5. The system recited in claim 4, wherein the vacuum cleaner includes a fan configured to generate an air stream, and wherein the supporting structure of the dust bag is configured to extend due to the air stream generated by the fan.

6. The system recited in claim 5, wherein the extension of the supporting structure caused by the air stream generated by the fan provides the spacing of the fleece corrugations that matches the spacing of the dust chamber ribs.

7. The system recited in claim 4, wherein the extension of the supporting structure caused by the air stream generated by the fan doubles a free flow area of the dust bag.

8. The system recited in claim 4, wherein the extension of the supporting structure caused by the air stream generated by the fan substantially doubles a free flow area of the dust bag.

9. The system recited in claim 1, wherein when the supporting structure is in an extended state, a width of the fleece corrugations is at least equal to a distance between the dust chamber ribs.

10. The system recited in claim 1, wherein when the supporting structure is in an extended state, an integral multiple of a width of the fleece corrugations is at least equal to a distance between the dust chamber ribs.

11. The system recited in claim 1, wherein when the supporting structure is in an extended state, tops of the dust chamber ribs engage in respective spaces between fleece corrugations.

* * * * *